US007735213B2

(12) United States Patent
Yasui et al.

(10) Patent No.: US 7,735,213 B2
(45) Date of Patent: Jun. 15, 2010

(54) METHOD FOR FABRICATING MAGNETIC HEAD SLIDER

(75) Inventors: Nobuto Yasui, Kanagawa (JP); Katsuro Watanabe, Ibaraki (JP); Takateru Seki, Kanagawa (JP); Kazuhito Miyata, Kanagawa (JP); Tetsuya Matsusaki, Kanagawa-Ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 362 days.

(21) Appl. No.: 11/845,010

(22) Filed: Aug. 24, 2007

(65) Prior Publication Data

US 2008/0062579 A1 Mar. 13, 2008

(30) Foreign Application Priority Data

Aug. 25, 2006 (JP) ............................ 2006-228862

(51) Int. Cl.
*H04R 31/00* (2006.01)

(52) U.S. Cl. ............... 29/603.12; 29/603.01; 29/603.07

(58) Field of Classification Search ............. 29/603.01, 29/603.07, 603.12

See application file for complete search history.

(56) References Cited

U.S. PATENT DOCUMENTS

| | | | | |
|---|---|---|---|---|
| 5,761,790 | A * | 6/1998 | Carr et al. | 29/603.15 |
| 6,174,736 | B1 | 1/2001 | Tsukamoto et al. | |
| 6,920,016 | B2 * | 7/2005 | Yamakura et al. | 360/235.7 |
| 7,554,769 | B2 * | 6/2009 | Yamakura et al. | 360/234.5 |
| 2004/0045671 | A1 * | 3/2004 | Rejda et al. | 156/345.38 |
| 2005/0068691 | A1 * | 3/2005 | Kagami et al. | 360/324.2 |
| 2006/0103987 | A1 * | 5/2006 | Lille | 360/321 |

FOREIGN PATENT DOCUMENTS

| | | |
|---|---|---|
| JP | 11-175927 | 7/1999 |
| JP | 2003-086861 | 3/2003 |
| JP | 2005-108355 | 4/2005 |

* cited by examiner

*Primary Examiner*—Derris H Banks
*Assistant Examiner*—Azm Parvez
(74) *Attorney, Agent, or Firm*—Townsend and Townsend and Crew LLP; John Henkhaus

(57) ABSTRACT

Embodiments of the present invention provide a method of fabricating a magnetic head slider realizing high-recording density at high-yields by preventing formation of a short circuit on the air-bearing surface of a magnetic head slider and preventing formation of an oxidized layer with significant film thickness which increases the effective magnetic spacing, on the air-bearing surface of the magnetic head slider. According to one embodiment, after air-bearing surface mechanical lapping of a row bar or a magnetic head slider, cleaning is performed by ion beam bombardment to remove a conductive smear. Oxygen exposure is performed to recover a damaged region which was formed by ion beam bombardment at the end face of an intermediate layer of a magnetoresistive film 5. Thereafter, air-bearing surface protection films are formed and followed by rail formation. If the processes are performed on the row bar, the row bar is cut into individual separated magnetic head sliders.

8 Claims, 10 Drawing Sheets

(a) 50 L (b) 10 22 22 24 26 24 A 22 A 24 20 30 40

(c) 42 1 48 46 44 3 5 4 20 34 32 28

Form element
101
Cut wafer
102
Mechanically lap magnetic head air-bearing surface
103
Clean air-bearing surface by ion beams
104
Recover damaged region by oxygen exposure
105
Form air-bearing surface protection film
106
Form rails
107
Cut row bar
108

Fig.2
(a)
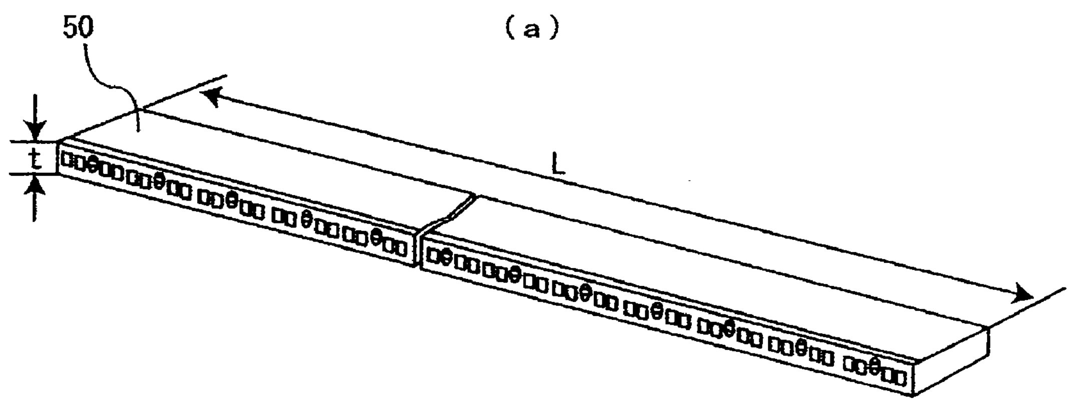
(b)
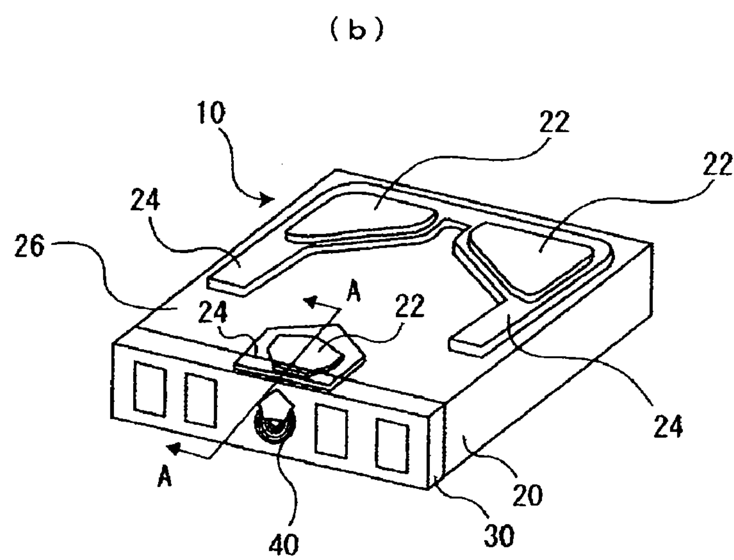
(c)
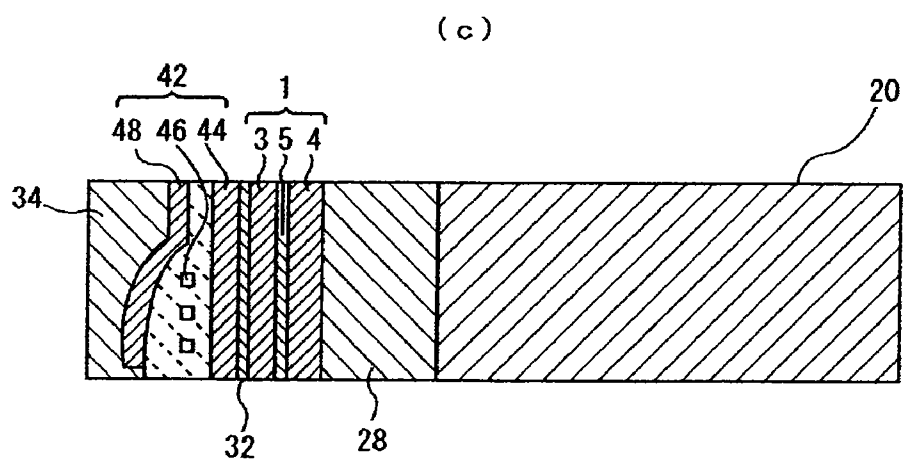

Fig.9

| | Method | Oxidized layer | SN ratio | Resolution | Judgment |
|---|---|---|---|---|---|
| Test example 1 | Oxygen exposure (90 sec) | 0. 1nm | 9. 8% | 0. 0% | ○ |
| Test example 2 | Oxygen exposure (50 sec) | 0. 1nm | 4. 5% | 0. 0% | ○ |
| Test example 3 | Oxygen exposure (1 sec) | 0. 1nm | 0. 3% | 0. 0% | ○ |
| Test example 4 | Oxygen exposure (180sec) | 0. 1nm | 9. 7% | 0. 0% | ○ |
| Test example 5 | Oxygen exposure (600sec) | 0. 2nm | 10. 1% | 0. 0% | ○ |
| Comparative example 1 | No oxygen exposure | 0. 0nm | 0. 0% | 0. 0% | |
| Comparative example 2 | Oxygen ion beam | 1. 5nm | 8. 2% | −1. 4% | × |
| Comparative example 3 | Ozone processing | 2. 5nm | 8. 8% | −2. 5% | × |
| Comparative example 4 | Air exposure | 2. 0nm | 3. 3% | −2. 2% | × |
| Comparative example 5 | No cleaning | 1. 5nm | −22. 4% | −5. 1% | × |

METHOD FOR FABRICATING MAGNETIC HEAD SLIDER

CROSS-REFERENCE TO RELATED APPLICATION

The instant nonprovisional patent application claims priority to Japanese Patent Application No. 2006-228862, filed Aug. 25, 2006 and which is incorporated by reference in its entirety herein for all purposes.

BACKGROUND OF THE INVENTION

In recent years, magnetic read and write devices have rapidly developed in high-recording density as the amount of handled information has increased. Along with this tendency, high-sensitivity and high-output magnetic heads have been requested. To meet the request, magnetic heads using giant magnetoresistive (GMR) films providing high-output have been developed and further improved. However, there is concern that even the magnetic heads using the GMR films lack output for a recording density of greater than $9.3\times10^9$ bits/cm$^2$. Therefore, a magnetic head has been researched and developed which uses a tunneling magnetoresistive (TMR) element or CPP (Current Perpendicular to the Plane) GMR film allowing electric current to flow perpendicular to GMR surface, as the next-generation magnetoresistive element of the GMR film.

The magnetic head using the GMR film is largely different in structure from the magnetic head using the TMR film or CPP-GMR film. The former has a CIP (Current Into the Plane) structure which allows sensing current to flow in the direction parallel to the magnetoresistive film surface. The electrodes supplying the sensing current are provided on both sides of the magnetoresistive film. On the other hand, the latter has a CPP structure which allows the sensing current in a direction perpendicular to the film surface of the magnetoresistive film comprising the TMR film or CPP-GMR film. Therefore, the electrodes supplying the sensing current are provided to be laminated on the magnetoresistive film.

If a path which short-circuits upper and lower magnetic shields serving as electrodes exists in the magnetic head having the CPP structure, it forms a short-circuit for the sensing current. This poses a problem with a reduction in the signal of the magnetic head. In particular, when a short circuit is formed across an intermediate layer (a tunnel barrier layer or a current confined layer), the signal is significantly reduced.

A short circuit may be formed mainly at the following two places: (1) an end face of a magnetoresistive film perpendicular to a stacked surface, the end face forming a portion of a magnetic recording medium-facing surface; (2) an end face of a magnetoresistive film in contact with a refill film formed in an element height direction and in an track width direction.

The short circuit formed at (2) is formed in a process for forming the element height of the magnetoresistive film and a process for forming the track width. In the processes, an unnecessary region is removed by the Ar ion beam etching method. At this time, a phenomenon called re-adhesion occurs in which the etched material removed adheres to the side wall of the magnetoresistive film. The etched material is a metal laminated film, which is conductive, and so it can form a short circuit. As a method of preventing leakage of the sensing current due to the re-adhesion, Japanese Patent Publication No. 2003-86861 ("patent document 1") discloses a method of preventing the short circuit by oxidizing the re-deposited material after the etching.

It is known that in the air-bearing surface lapping process of a magnetic head slider, the short circuit formed at (1) occurs when the air-bearing surface of the magnetoresistive film is lapped by using a plate embedded with minute diamond abrasive grains. In the air-bearing surface lapping process, the air-bearing surface is mechanically lapped for smoothing by the grinding operation of the hard grains and plastic flow operation. A metal element which forms a magnetic shield layer, a magnetoresistive film or a magnetic domain control film plastically flows to form a smear at an end face forming a portion of a magnetic recording medium-facing surface thereof. Since the smear is made of metal, it is conductive, which forms a short circuit for sensing current. A method of preventing short-circuit due to a smear is disclosed by Japanese Patent Publication No. 1999-175927 ("patent document 2"). This method involves removing a smear getting across a magnetoresistive film produced by mechanical lapping by plasma or ion-used dry etching after the mechanical lapping.

The method of removing the short-circuit formed at (1) is achieved not only by the dry etching method but also by applying the method described in patent document 1 used to remove the short-circuit formed at (2), to the magnetic recording medium-facing surface to form an oxidized layer on the air-bearing surface.

Japanese Patent Publication No. 2005-108355 ("Patent document 3") describes a method of forming an oxidized layer on the air-bearing surface by using air, ion beams, ozone or the like in an air-bearing surface protection film forming process although the purpose of the method is as below. Even if a magnetoresistive element is placed high-temperature environment, the change of the resistance value of the magnetoresistive element before and after the placement is reduced to thereby enhance the stability of the characteristic relative to the high-temperature environment.

If dry etching is performed after the air-bearing surface lapping of the magnetic head slider, it is possible to remove the smear resulting from the plastic flow during the lapping. However, a damaged region produces the lowering of output or of withstand voltage. This damaged region is formed on an end face which forms a portion of the air-bearing surface of a magnetoresistive film, a magnetic domain control film, a refill film or a magnetic shield film. In addition, the damaged region is a region where a short-circuit or magnetically insensitive layer is formed at a portion of the air-bearing surface of a magnetoresistive film, a magnetic domain control film, a refill film or a magnetic shield film due to film quality alteration by the dry etching or to element interdiffusion with an adjacent film. In particular, if the tunnel barrier layer of a TMR film is damaged, the magnetoresistive effect of the TMR film is reduced to significantly lower output. Similarly, if the current confined layer of a CPP-GMR film is damaged, the magnetoresistive effect of the CPP-GMR film is reduced to significantly lower output.

On the other hand, when an oxidized layer is formed on a air-bearing surface by ozone exposure, air exposure, or oxygen ion beam bombardment, the damaged region may be removed in some cases. However, the oxidized layer formed on the air-bearing surface of a magnetic head cannot maintain sufficient corrosion resistance. Therefore, it is necessary to further form an air-bearing surface protection film after formation of the oxide film. Consequently, effective magnetic spacing is increased according to the thickness of the oxidized layer. This lowers read and write resolution when the magnetic head slider is caused to fly.

If the dry etching is not used in order not to form a damaged region on a air-bearing surface, it is impossible to remove a conductive smear formed by mechanical lapping, which significantly lowers signal.

Because of the problems described above, a method of manufacturing a high-recording density magnetic head at high-yields has not been realized under existing circumstances.

BRIEF SUMMARY OF THE INVENTION

Embodiments of the present invention to provide a method of fabricating a magnetic head slider realizing high-recording density at high-yields by preventing formation of a short circuit on the air-bearing surface of a magnetic head slider and preventing formation of an oxidized layer with significant film thickness which increases the effective magnetic spacing, on the air-bearing surface of the magnetic head slider. According to the particular embodiment disclosed in FIG. 6, after air-bearing surface mechanical lapping of a row bar or a magnetic head slider, cleaning is performed by ion beam bombardment to remove a conductive smear. Oxygen exposure is performed to recover a damaged region 14*a* which was formed by ion beam bombardment at the end face of an intermediate layer 14 of a magnetoresistive film 5. Thereafter, air-bearing surface protection films 7, 8 are formed and followed by rail formation. If the processes are performed on the row bar, the row bar is cut into individual separated magnetic head sliders.

BRIEF DESCRIPTION OF THE DRAWINGS

FIGS. 2(*a*)-2(*c*) include respective perspective views of a row bar and a magnetic head slider and a cross-sectional view of a head element section, pertaining to embodiments of the present invention.

FIG. 9 is a diagram illustrating evaluation results of the test examples of the first embodiment and of comparative examples.

DETAILED DESCRIPTION OF THE INVENTION

Figure 1:
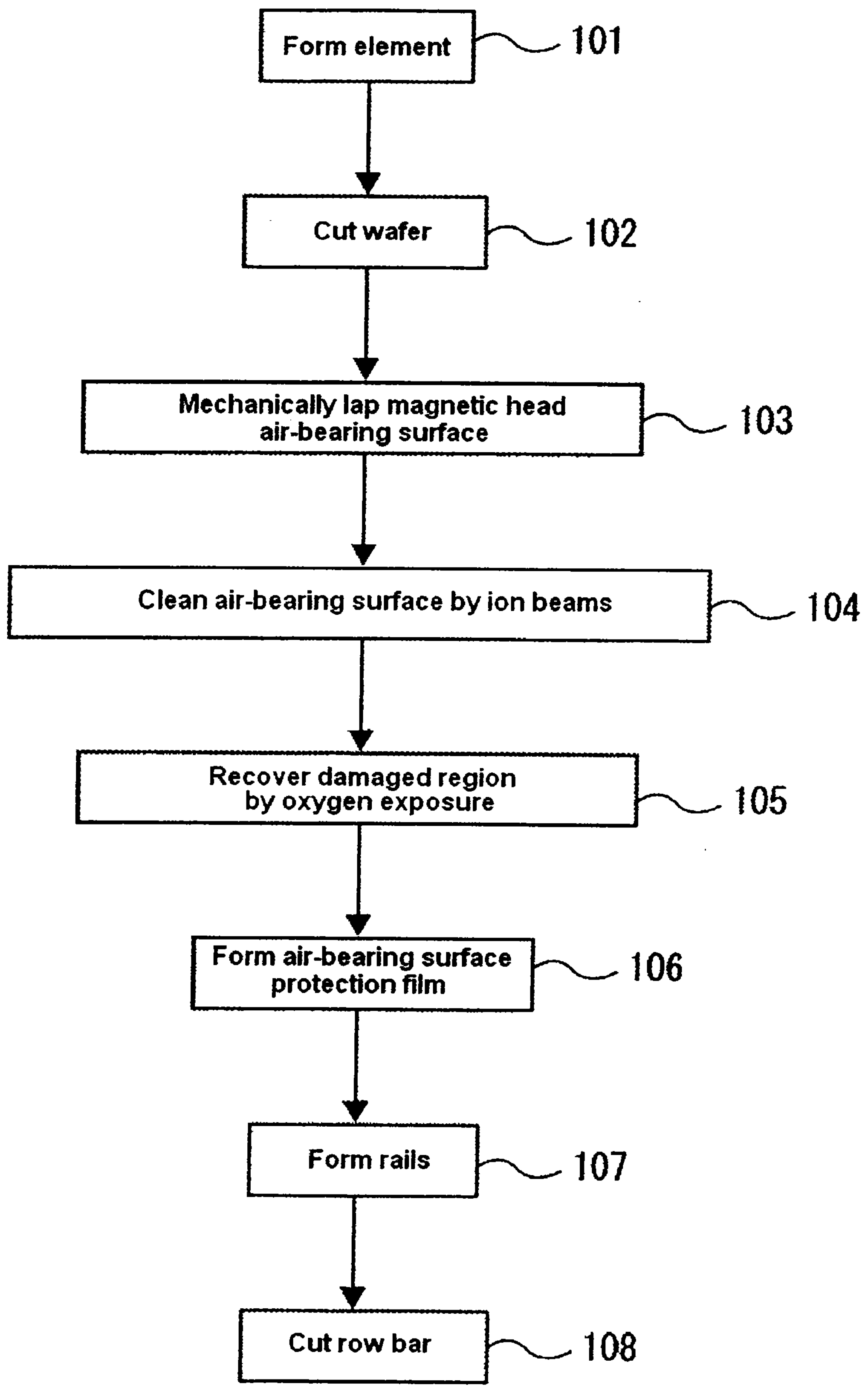
FIG. 1 is a process flow chart illustrating a magnetic head slider fabrication method according to a first embodiment of the present invention.

Embodiments in accordance with the present invention relates to a magnetic head slider including a magnetoresistive element such as a giant magnetoresistive (GMR) or tunneling magnetoresistive (TMR) element.

In view of the forgoing, the present invention has been made and it is an object of embodiments according to the present invention to provide a method of fabricating a magnetic head slider realizing high-recording density at high-yields by preventing formation of a short circuit on the air-bearing surface of a magnetic head slider and preventing formation of an oxidized layer with significant film thickness which increases the effective magnetic spacing, on the air-bearing surface of the magnetic head slider.

According to embodiments of the present invention, an air-bearing surface protection film is formed in a vacuum chamber after air-bearing surface mechanical-lapping performed on a row bar or magnetic head slider. Specifically, an air-bearing surface is dry etched by using an ion beam or gas plasma in order to remove a conductive smear formed by the mechanical lapping. Following this process, gas containing an appropriate amount of oxygen is introduced in the vacuum chamber. This introduction recovers a damaged region formed by the dry etching process at a portion of the air-bearing surface side of the magnetic head element without formation of an oxidized layer having a significant thickness on the air-bearing surface side. Thereafter, the air-bearing surface protection film is formed. In this way, the problem described above can be solved.

According to embodiments of the present invention, a magnetic head slider can be manufactured which has not a damaged region leading to lowered yields and which is formed with no oxidized layer having a significant film thickness, at an end face forming a portion of the air-bearing surface of a magnetoresistive film, a refill film, a magnetic domain control film or a magnetic shield film. In addition, a magnetic head fabrication method high in yield can be provided.

A description will hereinafter be made of a magnetic head slider fabrication method according to embodiments of the present invention with reference to the drawings.

A configuration of a magnetic head slider according to an embodiment of the present invention is first described with reference to FIG. 2. FIG. 2(*a*) is a perspective view of a row bar cut out from a wafer. FIG. 2(*b*) is a perspective view of a magnetic head slider obtained by cutting and separating the row bar. FIG. 2(*c*) is a cross-sectional view taken along line A-A of FIG. 2(*b*). The row bar 50 is composed of about 50 magnetic head elements joined together and has a length L of about 50 mm and a thickness t of about 0.3 mm. The magnetic head element 10 includes a slider 20 and a head element section 30, which is provided with a magnetic head element 40. Air-bearing surface rails 22, lower rails 24 and a lower surface 26 are formed on the air-bearing surface of the magnetic head slider 10. As shown in FIG. 2(*c*), the magnetic head element 40 is composed of a read element 1 and a write element 42 which are laminated via an insulating film 28 on an end face of the slider 20 made of a ceramic material. The read element 1 is composed of a lower magnetic shield film 4, a magnetoresistive film 5 such as a TMR film or CPP-GMR film and an upper magnetic shield film 3. The write element 42 is an inductive element laminated on an insulating separation film 32 formed on the upper magnetic shield film 3 and is composed of a lower magnetic film 44, a coil 46 and an upper magnetic film 48. The write element 42 is covered with an insulating protection film 34 from above.

Figure 3:
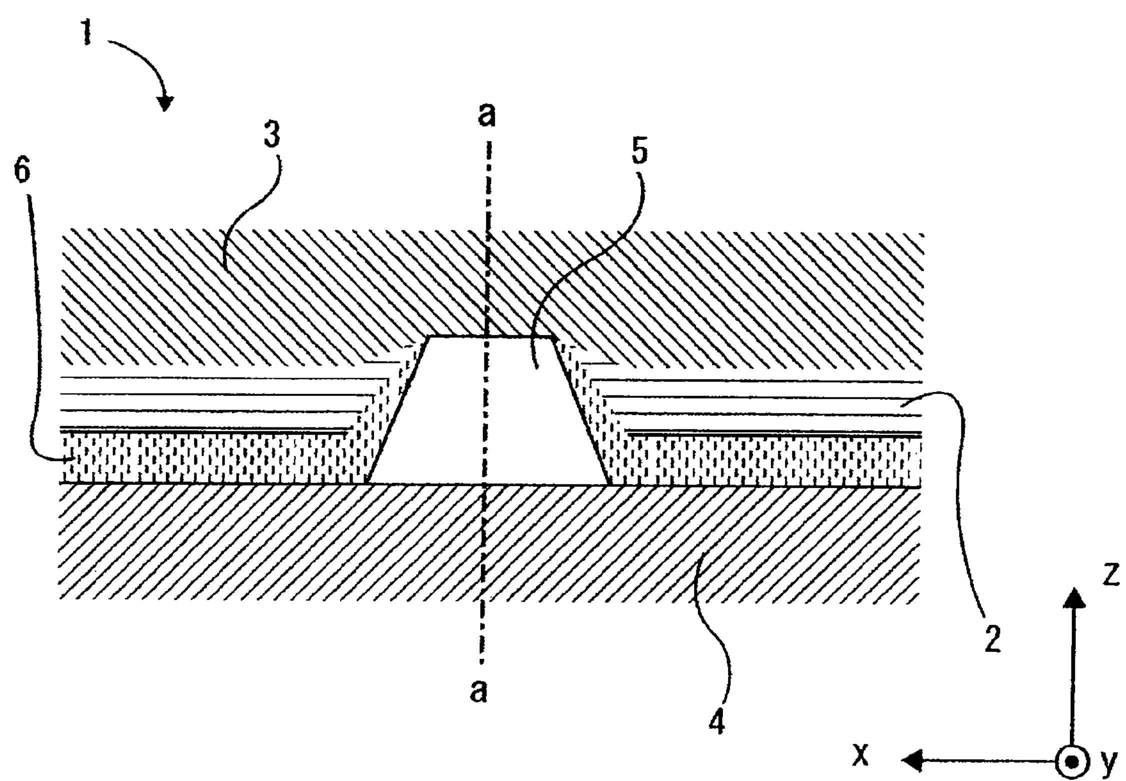
FIG. 3 is a schematic diagram of the air-bearing surface of a read element having CPP structure.
Figure 4:
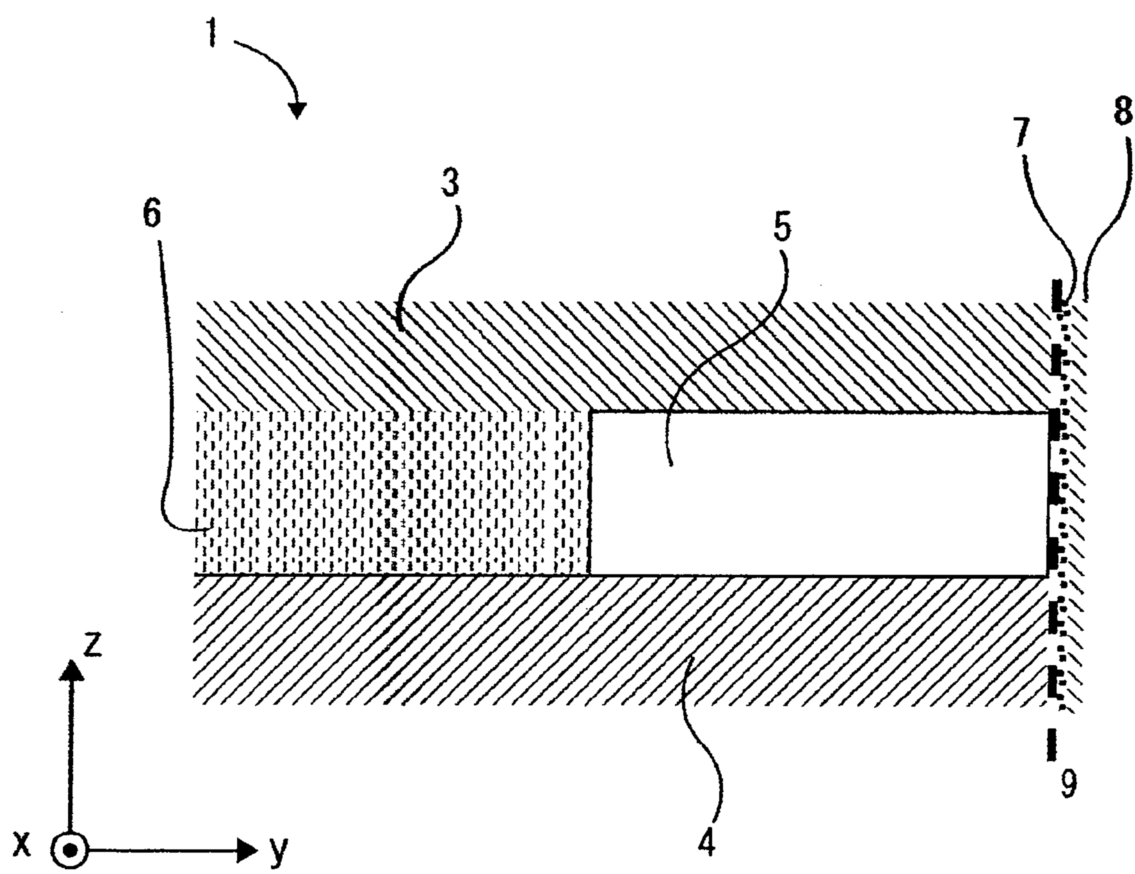
FIG. 4 is a schematic diagram of the read element having CPP structure in cross-section taken along an element height direction.

A description is next made of the basis structure of the read element of a CPP structure using a magnetoresistive film comprising a TMR film or CPP-GMR film. FIG. 3 is an illustration of the air-bearing surface of the read element having the CPP structure. In FIG. 3, X axis, Y axis and Z axis indicate a track width direction, an element height direction and the thickness direction of the laminated film of the magnetoresistive film, respectively. FIG. 4 is a cross-sectional view taken along line a-a of FIG. 3 and in the element height direction. In FIG. 4, X axis, Y axis and Z axis are the same as X axis, Y axis and Z axis, respectively, in FIG. 3. The read element 1 has the magnetoresistive film 5 provided between the upper magnetic shield film 3 and the lower magnetic shield film 4, and refill films 6 and magnetic domain control films 2 provided on both sides of the magnetoresistive film 5. On the right side of FIG. 4 is an air-bearing surface 9. An air-bearing surface protection film adhesion layer 7 made of silicon and an air-bearing surface protection uppermost layer 8 made of hard amorphous carbon are provided at the air-bearing surface 9.

Figure 5:
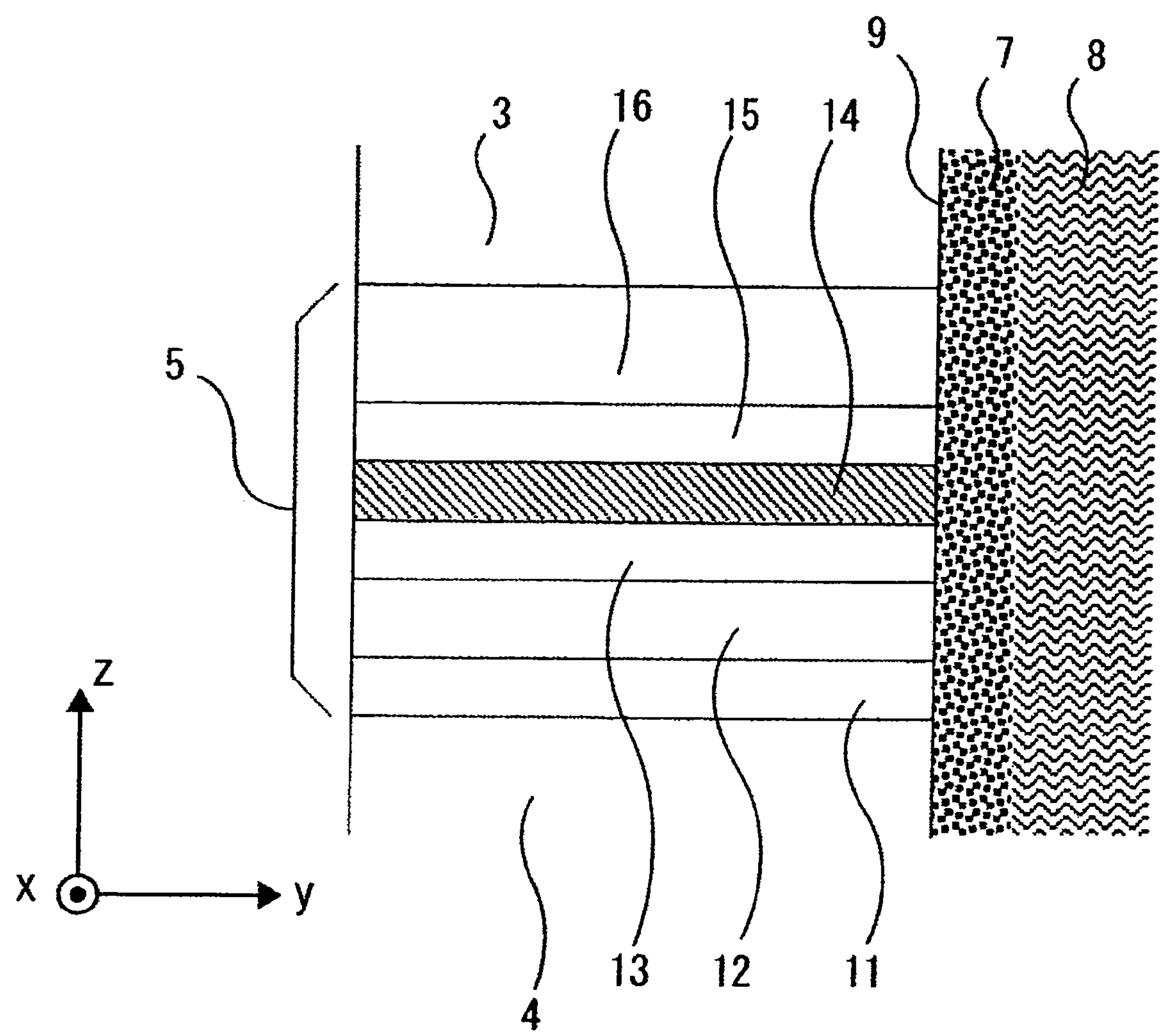
FIG. 5 is a cross-sectional view illustrating the laminated structure of a magnetoresistive film included in the read element of FIG. 4.

FIG. 5 shows the detailed laminated structure of the magnetoresistive film included in the read element having CPP structure shown in FIG. 4. In the read element 1 having the CPP structure, sensing current is allowed to vertically flow along the laminated surface of the magnetoresistive film 5 and between the upper magnetic shield film 3 and lower magnetic shield film 4. As shown in FIG. 5, the magnetoresistive element 5 includes a lower metal film 11, an antiferromagnetic layer 12, a pinned layer 13, an intermediate layer 14, a free layer 15 and an upper metal film 16 which are put between the lower magnetic shield layer 4 and the upper magnetic shield film 3. The lower metal film 11 uses Ta, Ru or a Ni—Fe alloy or a laminated film thereof. The antiferromagnetic layer 12 uses an antiferromagnetic film made of a Pt—Mn alloy or a Mn—Ir alloy or a hard magnetic film made of Co—Pt alloy or Co—Cr—Pt alloy. An antiparallel coupling high-coercivity, the so-called self-pin, may be used as the hard magnetic film. The pinned layer 13 and the free layer 15 can use a high-polarizability material such as a Ni—Fe alloy, a Co—Fe alloy, a Co—Ni—Fe alloy, magnetite or a Heusler alloy or a laminated film thereof. Alternatively, a multilayer film may be used which has ferromagnetic layers laminated via a spacer layer with a thickness of not greater than 1 nm. If the TMR film is used, the intermediate layer 14 is a tunnel barrier layer, specifically, oxide of a mixture of Al, Mg, Si, Zr or Ti, or a laminated body of such oxide. If the CPP-GMR film is used, the intermediate layer 14 is a conductive layer or a conductive layer having a current confined layer. Specifically, the intermediate layer 14 may use Al, Cu, Ag or Au, or a mixture thereof or a laminated body thereof. Alternatively, a layer may be inserted which performs current confined by partially oxidizing or nitriding a portion of them. The upper metal film 16 may use Ta, Ru or a Ni—Fe alloy or a laminated film thereof. The lower magnetic shield film 4 and the upper magnetic shield film 3 use a Ni—Fe alloy.

Incidentally, the lamination structure of the magnetoresistive film 5 is not limited to the above examples. For example, the lamination structure may be such that on the lower magnetic shield film 4, the lower metal film, the free layer, the intermediate layer, the pinned layer, the antiferromagnetic layer, the upper metal film and the upper magnetic shield film 3 are laminated in this order.

A description is next made of a magnetic head slider fabrication method according to a first embodiment of the present invention with reference to FIG. 1. The first embodiment uses a TMR film as the magnetoresistive film 5 of the read element 1 and uses magnesium oxide for the tunnel barrier layer 14. In process 101, a plurality of magnetic head elements 40 are first formed on a base material (wafer) of alumina titanium carbide. In process 102, the wafer is then cut into stripe-shaped row bars 50 by a dicing saw. In process 103, a surface (hereinafter, simply called an air-bearing surface) of the row bar 50 which becomes an air-bearing surface of a magnetic head slider is mechanically lapped by using e.g. a plate embedded with diamond abrasive grains so that the element height of the magnetic head element 40 may be a desired value. At this time a conductive smear is formed due to plastic flow during the mechanical lapping, at a position near an end face constituting part of the air-bearing surface 9 of the TMR film 5.

Figure 6:
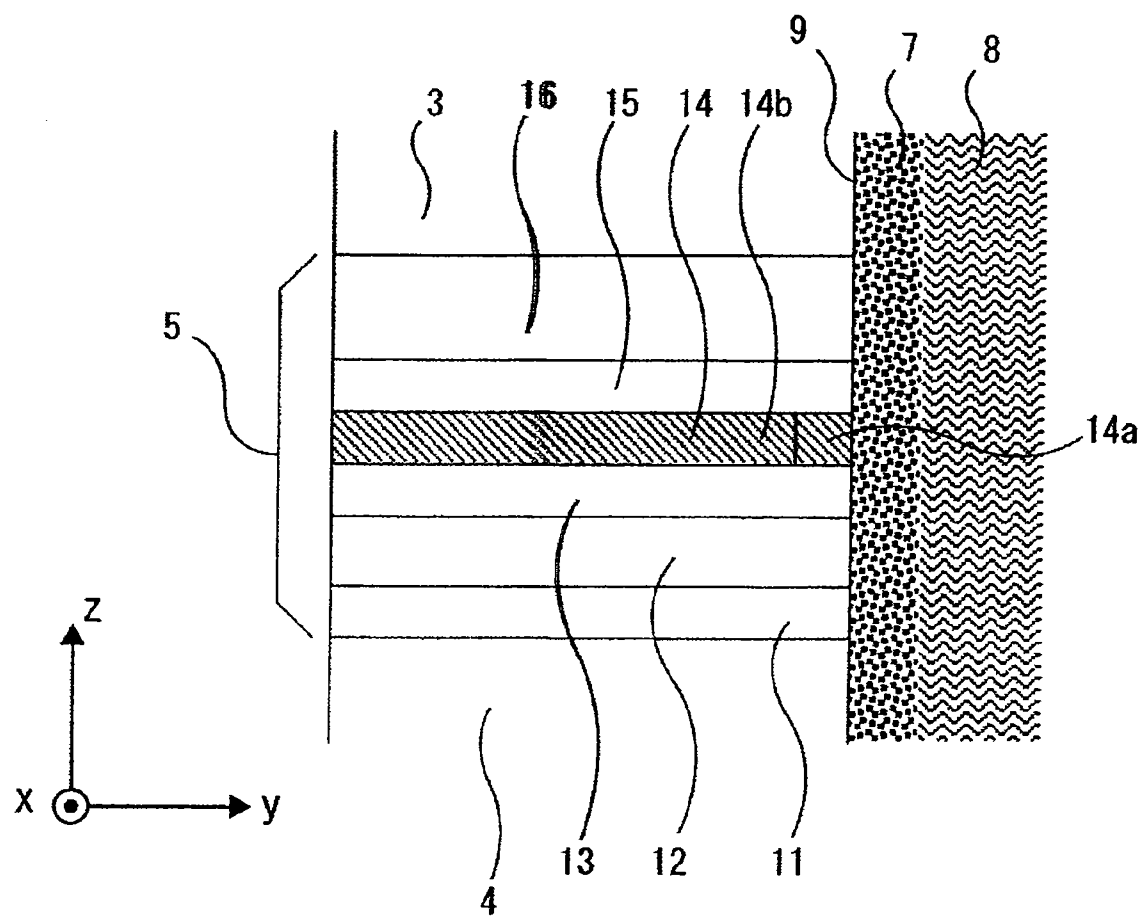
FIG. 6 is a cross-sectional view illustrating a damaged region formed in a cleaning process using ion beams, taken along the element height direction.

After the mechanical lapping process 103 is finished, the row bar is carried in a vacuum chamber to form an air-bearing surface protection film on the air-bearing surface of the row bar 50. In process 104, the air-bearing surface is cleaned by argon ion beam bombardment to remove the conductive smear. A noble gas ion such as neon, helium, krypton or xenon ion may be used instead of argon ion. Ion incident energy is 300 eV, an ion incident angle is 75 degrees from a normal line of the air-bearing surface, ion beam current is 300 mA and bombardment time is 60 seconds. However, these conditions may be changed if the conductive smear due to the plastic flow formed during the mechanical lapping can be removed. The cleaning by the ion beam bombardment forms a damage region 14*a*, as shown in FIG. 6, at a position near the end face constituting a portion of the air-bearing surface 9 of the tunnel barrier layer 14 of the TMR film 5. Incidentally, the cleaning process may use sputter etching by gas plasma.

When observed under a transmission electron microscope, the damage region 14*a* was a region where a portion of oxygen of magnesium oxide forming the tunnel barrier layer 14 was deficient, a region where a metal element diffused from an adjacent metal layer, or a region where the crystallinity of magnesium oxide altered compared with that of the region 14*b*. The region where oxide is deficient becomes metal magnesium, which forms a short circuit. Similarly, the region where a metal element diffuses also forms a short circuit. The region where the crystallinity of magnesium oxide alters deteriorates in magnetoresistive effect because the tunneling magnetoresistive effect depends on crystallinity.

Following the cleaning process, in process 105, a recovery process is performed on the damaged region 14*a*. Specifically, gas containing oxygen is introduced in the vacuum chamber. The flow rate of the oxygen gas is adjusted to 5 sccm by a mass flowmeter. When oxygen is introduced, oxygen partial pressure in the vacuum chamber is approximately $5\times10^{-3}$ Pa. After a lapse of specified time from the start of oxygen introduction, the oxygen introduction is stopped. Exposure conditions such as oxygen exposure time are detailed later. The oxygen exposure injects oxygen in the region where oxygen of magnesium oxide is deficient to thereby recover magnesium oxide, and causes the metal element to be oxide in the region where the metal element diffuses to thereby remove the short circuit, providing the initial insulating characteristic. In addition, the oxygen exposure causes magnesium oxide to recover its crystallinity, thereby recovering the initial tunneling magnetoresistive effect.

The oxygen supply method is not limited to the above examples. For example, while the air-bearing surface is shielded by a shutter to prevent direct bombardment, oxygen ion beam bombardment is performed for a given length of time, which provides the same effect as that of the processes described above. This is due to the following reasons: If the air-bearing surface is shielded by the shutter, it is possible to remove ions that directly impinge on the air-bearing surface at high-energy. In addition, an amount of radical that runs around and reaches the air-bearing surface can be neglected.

Therefore, the exposure effect resulting from only oxygen molecule can actually be used.

In process 106, the air-bearing surface protection film adhesion layer 7 comprising e.g. silicon is formed to a thickness of only 0.5 nm by a sputtering method. The material of the air-bearing surface protection film adhesion layer 7 is not limited to silicon and for example may be a film containing one or more elements selecting from the group consisting of silicon, tungsten, chrome and titanium, or nitride, oxide or oxynitride of any one of the above-mentioned films. The film forming method is not limited to the sputtering method and may be an ion beam deposition method, a thermal deposition method or a CVD method. As long as having sufficient anticorrosion and wear resistance, the film thickness of silicon is not particularly limited. Before the formation of the air-bearing surface protection film adhesion layer 7, the silicon surface which is a sputtering target is sputtered by argon plasma while the air-bearing surface 9 is shielded by the shutter to prevent formation of a silicon film. This process is carried out in order to remove an oxide film formed by oxygen introduction on the silicon surface which is the sputtering target. However, this process may be omitted. After the silicon surface oxidized layer which is the sputtering target is sputtered for sufficient time, the shutter which has shielded the air-bearing surface 9 is opened and the air-bearing surface protection film adhesion layer 7 is formed.

After the formation of the air-bearing surface protection film adhesion layer 7, the air-bearing surface protection film uppermost layer 8 made of hard amorphous carbon and having a film thickness of 1.0 nm is formed by using a cathode vacuum arc deposition method. The method of forming the hard amorphous carbon film may be a CVD method, an ion beam method, or a laser ablation deposition method. As long as there is sufficient anticorrosion and wear resistance, the material of the air-bearing surface protection film uppermost layer 8 is not limited to the hard amorphous carbon and may be carbon, boron, silicon or aluminum, or oxide, nitride or oxynitride thereof. Alternatively, after the formation of the air-bearing surface protection film uppermost layer 8, the surface processing of some kind may be performed on the air-bearing surface protection film uppermost layer 8. After the formation of the air-bearing surface protection film uppermost layer 8, the row bar is taken out of the vacuum chamber.

In a rail formation process 107, ion milling using a photoresist mask is next performed two times on the air-bearing surface formed with the air-bearing surface protection film to form the air-bearing surface rails 22, the lower rails 24 and the lower surface 26.

In a row bar cutting process 108, the row bar 50 is cut, for every magnetic head element 40 by a dicing saw, into the separated magnetic head sliders 1 as shown in FIG. 2(*b*).

Figure 7:
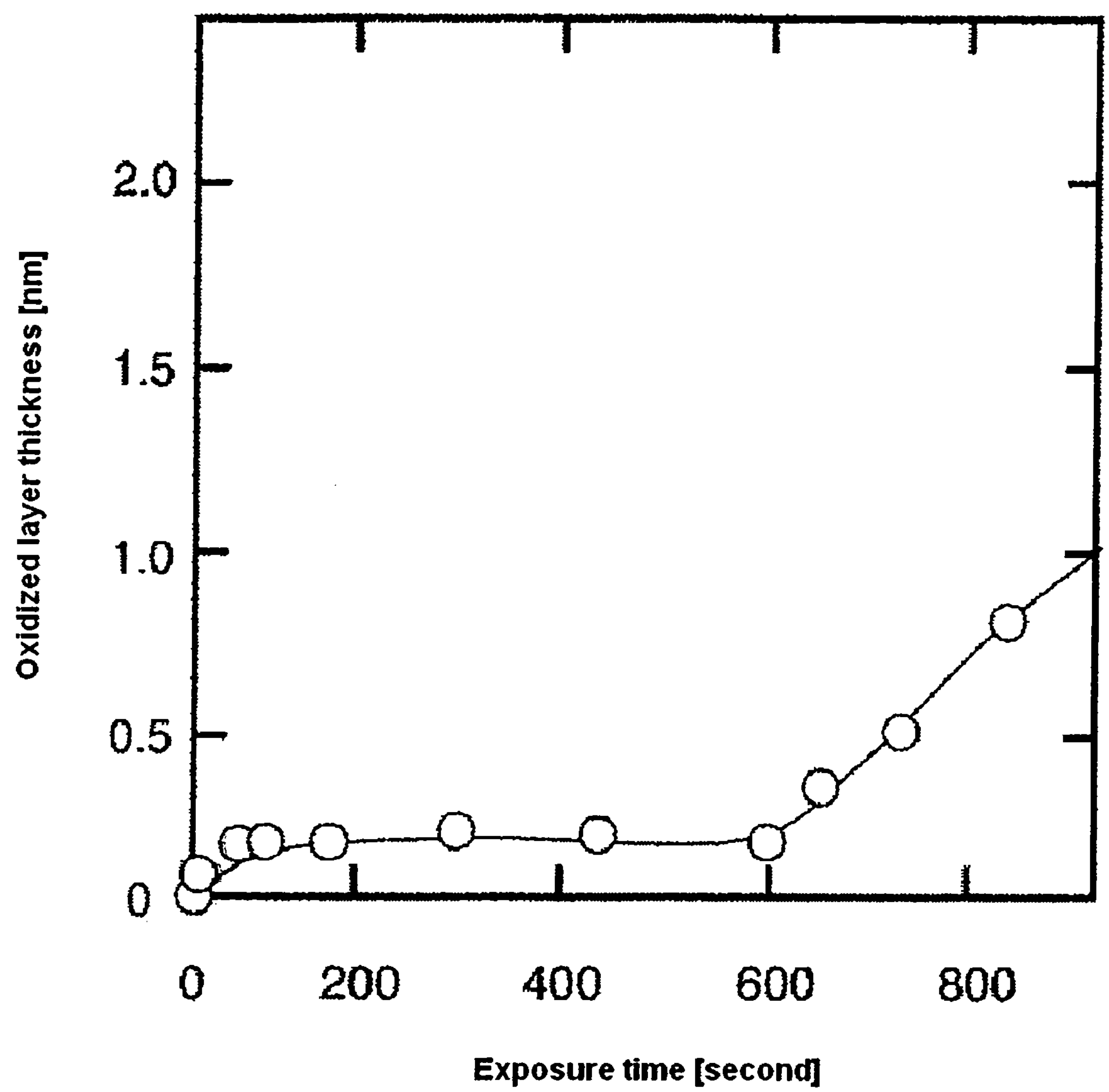
FIG. 7 is a diagram illustrating the relationship between oxygen exposure time and oxidized layer growth in oxidization of the air-bearing surface.

A detailed description is next made of the exposure conditions of the process 105 for recovering the damage region resulting from oxygen exposure. FIG. 7 shows oxygen exposure times plotted on the horizontal axis and the film thicknesses of oxidized layers on a 46 at.Ni-54 at.% Fe film plotted on the vertical axis. The oxygen exposure was performed at an oxygen flow rate of 5 sccm and at an oxygen partial pressure of $5\times10^{-3}$ Pa in the vacuum chamber. FIG. 7 shows that the oxidized layer thickness is increased along with increased exposure time. However, the manner of the increase is not uniform. At the beginning of the exposure, the oxidized layer thickness is thin and its growth rate is small. After the lapse of a given time, the growth rate increases and saturates at not thinner than 1 nm and not thicker than 3 nm. In addition, the larger the oxygen partial pressure is, the larger the growth rate becomes. This is because the number of oxygen molecules impinging on a unit area per unit time increases with increased oxygen partial pressure. Thus, when the product of the oxygen partial pressure and the exposure time is constant, the number of oxygen molecules impinging on the sample surface is constant. Therefore, the degree of oxidization is equal.

Figure 8:
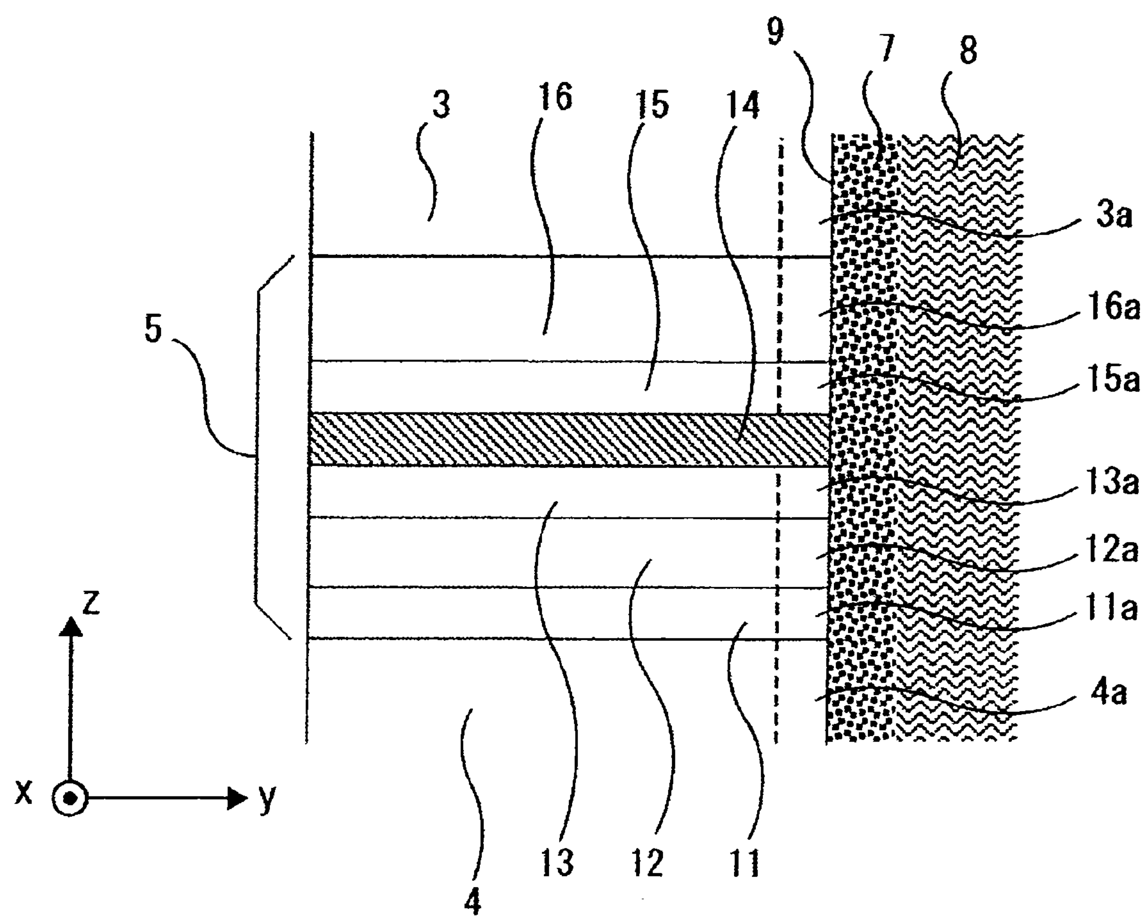
FIG. 8 is a cross-sectional view illustrating an oxidized layer having significant film thickness formed by oxygen ion beam bombardment, ozone processing, or air exposure, taken along the element height direction.

The thicknesses of the oxidized layer formed on the surface of the 46 at.% Ni-54 at.% Fe film were measured under a transmission electron microscope. The oxidized layer thickness can be measured by observing the element height y cross-section as shown in FIG. 8. Needless to say, the method of measuring the oxidized layer thickness is not limited to the transmission electron microscope. It is possible to measure the oxidized layer thickness also by using auger electron spectroscopy, X-ray photoelectric spectroscopy, or secondary ion mass spectroscopy.

If the exposure time is too long particularly, the damage area 14*a* of the tunnel barrier layer 14 is recovered. However, the end faces of the metal films above and below the tunnel barrier layer 14 are oxidized to form oxidized layers. Specifically, an oxidized layer 4*a* of the lower magnetic shield film 4 is formed at the end face of the lower magnetic shield film 4. An oxidized layer 11*a* of the lower metal layer 11 is formed at the end face of the lower metal layer 11. An oxidized layer 12*a* of the antiferromagnetic layer 12 is formed at the end face of the antiferromagnetic layer 12. An oxidized layer 13*a* of the pinned layer 13 is formed at the end face of the pinned layer 13. An oxidized layer 15*a* of the free layer 15 is formed at the end face of the free layer 15. An oxidized layer 16*a* of the upper metal layer 16 is formed at the end face of the upper metal layer 16. An oxidized layer 3*a* of the upper magnetic shield film 3 is formed at the end face of the upper magnetic shield film 3. While not depicted in FIG. 8, an oxidized layer is formed at the end face of the magnetic domain control film as well. In this case, the effective magnetic spacing is increased according to the film thickness of the oxidized layers as described above.

Magnetic head sliders are manufactured by the magnetic head fabrication method according to the first embodiment described above at an oxygen partial pressure of $5\times10^{-3}$ Pa while the exposure time is varied. For test example 1, oxygen exposure time was 90 seconds. For test example 2, oxygen exposure time was 50 seconds. For test example 3, oxygen exposure time was 1 second. For test example 4, oxygen exposure time was 180 seconds. For test example 5, oxygen exposure time was 600 seconds. For comparison with test examples 1 through 5 mentioned above, also the magnetic head sliders were manufactured by the manufacturing methods of comparative examples 1 through 5.

Comparative Example 1

Comparative example 1 is a fabrication method not involving oxide exposure. After mechanical lapping, a row bar was carried in a vacuum chamber and cleaned by ion beam bombardment and then an air-bearing surface protection film was formed. The mechanical lapping, the cleaning by ion beam bombardment and the formation of the air-bearing surface protection film were each performed under the same conditions as those of the first embodiment. The magnetic head slider fabricated by the method of comparative example 1 is formed with the damaged region 14*a* caused by ion beams on the air-bearing surface 9 of the tunnel barrier layer 14 as shown in FIG. 6. When the damaged region 14*a* was observed under a transmission electron microscope, a region where oxygen of magnesium oxide forming the tunnel barrier layer 14 was partially deficient, a region where a metal element diffuses from the adjacent metal layer, or a region where the crystallinity of magnesium oxide altered compared with a rear region 14*b* was confirmed.

Comparative Example 2

Comparative example 2 is next described. Comparative example 2 is a fabrication method involving oxygen ion beam-used oxidization. After mechanical lapping, a row bar was carried in the vacuum chamber. The row bar was tilted so that the incident angle of ion beams was 75 degrees relative to the normal line of an air-bearing surface and was cleaned by oxygen ion beams at an acceleration voltage of 100V, at an ion beam current of 300 mA and at an exposure time of 40 seconds. Thereafter, an air-bearing surface was formed. The mechanical lapping and the formation of an air-bearing surface protection film were each performed under the same conditions as those of the first embodiment.

In the magnetic head slider fabricated by the method of comparative example 2, while the damage region 14*a* of the tunnel barrier layer 14 was recovered as shown in FIG. 8, the end faces of the metal films above and below the tunnel barrier layer 14 were oxidized to form oxidized layers. Thus, effective magnetic spacing is increased according to the film thicknesses of the oxidization films.

Comparative Example 3

Comparative example 3 is a fabrication method involving air-bearing oxidization by ozone exposure. After mechanical lapping, a row bar was carried in the vacuum chamber and cleaned by ion beam bombardment. Then ozone was introduced in the vacuum chamber to expose an air-bearing surface thereto and thereafter an air-bearing surface protection film was formed. The mechanical lapping, the cleaning by ion beam bombardment and the formation of the air-bearing surface protection film were each performed under the same conditions as those of the first embodiment. The magnetic head slider fabricated by the method of comparative example 3 was formed with an oxidized layer on the air-bearing surface 9 as shown in FIG. 8 as the magnetic head slider fabricated by comparative example 2.

Comparative Example 4

Comparative example 4 is next described. Comparative example 4 is a fabrication method involving air-bearing surface air exposure. After mechanical lapping, a row bar was carried in the vacuum chamber and cleaned by ion beam bombardment. Then the row bar was taken out of the vacuum chamber, an air-bearing surface was exposed to the air, the row bar was carried in the vacuum chamber again and an air-bearing-surface protection film was formed. The mechanical lapping, the cleaning by ion beam bombardment and the formation of the air-bearing surface protection film were each performed under the same conditions as those of the first embodiment.

The magnetic head slider fabricated by the method of comparative example 4 is formed with oxidized layers on the air-bearing surface 9 as shown in FIG. 8 as the magnetic head slider fabricated by comparative example 2.

Comparative Example 5

Comparative example 5 is next described. Comparative example 5 is a fabrication method not involving air-bearing surface cleaning by ion beam bombardment. After mechanical lapping was performed, a row bar was carried in the vacuum chamber, a air-bearing surface was exposed to oxygen gas and an air-bearing surface protection film was formed. The magnetic head slider fabricated by the method of comparative example 5 was formed with a conductive smear on an end face forming part of the air-bearing surface 9 of the magnetoresistive film 5.

The signal-to-noise ratio and resolution of the magnetic head sliders were determined for the above-described test examples and comparative examples. FIG. 9 shows the comparative results. The signal-to-noise ratio was obtained by dividing signal by noise. The signal was calculated from the variation of a resistance value encountered when a magnetic field of 140 Oe (11.2 kA/m) is applied to a read element in the element height direction while a constant current is applied to the read element with a magnetic head slider caused not to fly. Noise was obtained from the variations of readout of the resistance value encountered when a constant current is applied to the read element. Since the determination is performed with the magnetic head slider allowed not to fly, the variations of signal and noise caused by the magnetic head element can be evaluated. The resolution was obtained by dividing signal strength determined at high-frequency by signal strength determined at low-frequency with respect to signal strength encountered when the magnetic head slider is allowed to fly above a magnetic recording medium. Since resolution is increased with decreased magnetic spacing, it is an appropriate technique for evaluating overplus of magnetic spacing.

On the basis of the signal-to-noise ratio and resolution of the magnetic head slider fabricated by the method of comparative example 1, FIG. 9 indicates improvement with a positive symbol and deterioration with a negative symbol. In addition, comprehensive determination is done as below. A process in which improvement was confirmed in both the resolution and the signal-to-noise ratio with respect to comparative example 1 is judged as acceptance (o). A process in which at least one of the characteristics deteriorated with respect to comparative example 1 is rejection (x).

As shown in FIG. 9, when any means, namely, oxygen ion beam bombardment, ozone processing and air exposure according to respective comparative examples 2, 3 and 4 are used, an increase in signal-to-noise ratio can be confirmed. However, the oxidized layers having significant film thicknesses were formed on the air-bearing surface by oxidization. Therefore, the oxidized layers led to increased effective magnetic spacing, and deterioration in resolution was confirmed. In contrast to this, according to test examples 1 through 5, the oxygen exposure was performed so as not to contribute to growth of an oxidized layer. Therefore, it was confirmed to increase the signal-to-noise ratio without deterioration of resolution.

The increase effect of the signal-to-noise ratio due to oxygen exposure depends on the number of impingement of oxygen molecules on the magnetoresistive film. Therefore, when oxygen partial pressure is $10\times10^{-3}$ Pa, for an oxygen exposure time of 300 seconds a signal-to-noise recovery effect can be obtained which is equal to that at an oxygen partial pressure of $5\times10^{-3}$ Pa for an oxygen exposure time of 600 seconds.

In regard to the amount of oxygen exposure, the oxygen exposure is performed for longer than 1 second to increase the signal-to-noise ratio and the process at an oxygen partial pressure is $50\times10^{-3}$ for an exposure time of about 600 seconds produces significant deterioration of resolution. Thus, it is desired that oxygen partial pressure×exposure time be greater than 0.005 Pa·sec and not greater than 3 Pa·sec.

As described above, in the oxygen exposure after cleaning by ion beam bombardment following the air-bearing surface mechanical lapping, selecting the appropriate amount of oxygen exposure can increase the signal-to-noise ratio without the deterioration of resolution. Thus, the magnetic head slider realizing high-recording density can be fabricated at high-yields.

In the first embodiment, the air-bearing surface mechanical lapping, the air-bearing surface cleaning by ion beam bombardment, the recovery of the damaged region by oxygen exposure and the formation of the air-bearing surface protection film are performed on the row bar cut out from the wafer. However, the row bar cut out of the wafer is cut for every magnetic head element into separated magnetic head sliders and the above processes may be performed on each of the magnetic head sliders. Also this case can provide the same effect as that of the first embodiment.

A description is next made of a magnetic head fabrication method according to a second embodiment of the present invention. The second embodiment is characterized by including at least two processes for forming air-bearing surface protection films in a magnetic head slider fabrication process.

Figure 10:
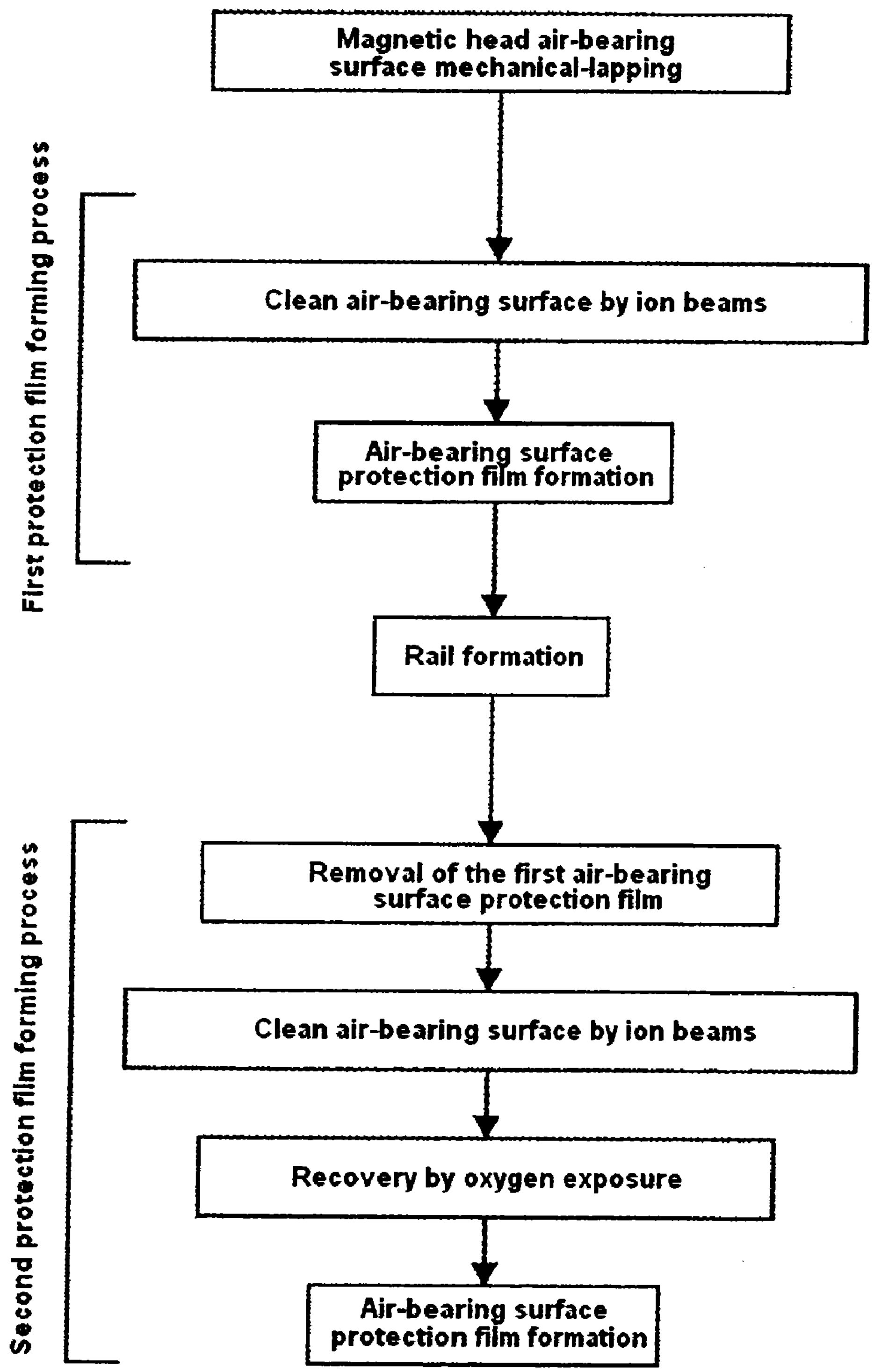
FIG. 10 is a process flow chart illustrating a magnetic head slider fabrication method according to a second embodiment of the present invention.

FIG. 10 illustrates a process flow for the magnetic head slider fabrication method including the two processes for forming of air-bearing surface protection films. In this process, a row bar or magnetic head slider subjected to air-bearing surface lapping is carried in a vacuum chamber. First cleaning of an air-bearing surface is performed by ion beams in order to remove a conductive smear formed by the mechanical lapping. Thereafter, a first air-bearing surface protection film is formed. At this time, a damaged region formed during the first cleaning of air-bearing surface by ion beams is formed at an end face forming part of the air-bearing surface of a magnetoresistive film, a refill film, a magnetic domain control film or a magnetic shield film. Slider rails are formed on the row bar or magnetic head slider which was formed with the first air-bearing surface protection film.

After the formation of the slider rails, the row bar or magnetic head slider is carried in the vacuum chamber. In the vacuum chamber, the first air-bearing surface protection film of the row bar or magnetic head slider is removed. The removal is performed by using oxygen plasma. The removing method is not limited to this. Instead of plasma, ion beam bombardment may be used. A noble gas such as helium, neon, krypton, or xenon or a reactive gas such as oxygen or nitrogen may be used. In addition, a plurality of combinations of the gases and/or methods mentioned above may be used.

After removal of the first air-bearing surface protection film, in the same vacuum chamber, the air-bearing surface is cleaned by second ion beams. The purpose of cleaning the air-bearing surface by these ion beams is to completely remove the residue of the first air-bearing surface protection film removing process and to adjust the shape of the vicinity of the end face forming a portion of the air-bearing surface of the magnetoresistive film. However, this process may not be needed if sufficient removal was done in the first air-bearing-surface protection film removing process and it was not necessary to adjust the shape of the vicinity of the end face forming a portion of the air-bearing surface of the magnetoresistive film.

At this moment, the damaged region is removed. The region was formed at the end face forming a portion of the air-bearing surface of the magnetoresistive film by the first ion beam air-bearing surface cleaning process. Instead, a damaged region is newly formed at an end face forming a portion of the air-bearing surface of the magnetoresistive film, the refill film, the magnetic domain control film, or the magnetic shield film by the first air-bearing surface protection removal process or the second ion beam air-bearing surface cleaning process.

At this time, a recovery process by oxygen exposure is performed. The oxygen exposure is done under the same conditions as those of the first embodiment, that is, for an exposure time of 90 seconds. The damaged region is recovered by this process. After the recovery process by oxygen exposure, a second air-bearing surface protection film is formed. If the above processes are performed on a row bar, the row bar is cut for every magnetic head element into individual separated magnetic head sliders.

The magnetic head slider fabrication method according to the second embodiment described above can recover the damaged region formed at the end face forming a portion of the air-bearing surface of the magnetoresistive film, the refill film, the magnetic domain control film, or the magnetic shield film. As the first embodiment, the signal-to-noise ratio can be increased without deterioration of resolution. Thus, the magnetic head slider realizing high-recording density can be manufactured at high-yields.

Like the magnetic head slider fabrication method according to the second embodiment, when the end face forming a portion of the air-bearing surface of the magnetoresistive film is exposed to a plurality of ion beam bombardments, the recovery process by oxygen exposure is performed immediately after the last ion beam bombardment. Thus, the magnetic head slider can be manufactured which has no damaged regions at the end face forming a portion of the air-bearing surface of the magnetoresistive film.

Incidentally, the embodiments described above use, as the magnetoresistive film, the TMR film in which the intermediate layer is a tunnel barrier layer. However, a magnetic head element that uses a CPP-GMR film in which the intermediate layer is a current confined film can provide the same effect as that of the embodiments described above. For the CPP-GMR film, ion beam bombardment forms a damaged region which vertically traverses the current confined layer with high-resistance. This damaged region acts as a short circuit or as a magnetically dead region, consequently reducing the signal-to-noise ratio. As described above, since the recovery process immediately after the ion beam bombardment on the air-bearing surface can remove the damaged region, it is significantly effective for the magnetic head element which uses the CPP-GMR film having the current confined film.

The magnetic head slider fabrication method which performs ion beam bombardment on an end face forming a portion of the air-bearing surface of the magnetoresistive film during the magnetic head slider fabrication can be applied to the following magnetic head elements: a magnetic head element which use a CPP-GMR film having a conductive layer as an intermediate layer; a magnetic head element which uses a CIP-GMR film; a magnetic head element which uses a magnetic semiconductor; and an magnetic head element which uses a polarized spin diffusion or accumulation phenomenon. Each magnetic head element mentioned above can provide the same effect as that of the embodiments described above. When a magnetoresistive film is exposed to direct bombardment in the ion beam bombardment on the air-bearing surface, the end face forming a portion of the air-bearing surface of the magnetoresistive film does not operate in a way intended as a magnetoresistive film because of a difference in sputtering rate or of diffusion of material with the adjacent layer. In contrast, the region that does not operate in a way intended as the magnetoresistive film is removed by the recovery process immediately after the ion beam bombardment on the air-bearing surface. Consequently, the noise and instability of the magnetic head element can be reduced.

The first and second embodiments perform oxygen gas exposure as the recovery process on the damaged region formed at the end face forming a portion of the air-bearing surface of the magnetoresistive film. The purpose of the recovery process is to remove the damaged region without formation of a chemically altered layer (e.g. an oxidized layer) which significantly increases effective magnetic spacing. Thus, as long as these conditions are met, not limited to oxygen gas, gas of a compound containing at least one selected from the group consisting of hydrogen, boron, carbon, nitrogen, oxygen, fluorine, silicon and chlorine may be used while process time and pressure during the process are limited to the range meeting the above request. Consequently, the same effect as that of the embodiments described above can be provided.

If the request to recover the damaged region is met, the step is not limited to gas exposure. Etching by a chemical solution may be used. If an ion beam process or a plasma process which defines the conditions to meet the above request is used, the same effect can be provided.

What is claimed is:

1. A method of fabricating a magnetic head element, comprising the steps of:

forming a plurality of magnetic head elements each having a magnetoresistive film on a wafer;

cutting the wafer into row bars;

cutting each of the row bars for every magnetic head element into separated magnetic head sliders;

mechanically lapping an air-bearing surface of the magnetic head slider;

cleaning the mechanically lapped air-bearing surface by using an ion beam or gas plasma;

exposing the cleaned air-bearing surface to gas;

forming a protection film on the air-bearing surface exposed to the gas; and forming a rail on the air-bearing surface on which the protection film is formed.

2. The method according to claim 1, wherein the gas is an oxygen-containing gas.

3. The method according to claim 2, wherein the product of time for introducing the oxygen-containing gas and oxygen partial pressure is not less than 0.005 Pa·sec and not greater than 3 pa·sec.

4. The method according to claim 1, wherein the magnetoresistive film includes an intermediate layer, a free layer formed on one laminated layer surface side of the intermediate layer, and a pinned layer formed on the other laminated layer surface side of the intermediate layer; and wherein the intermediate layer is a tunnel barrier layer.

5. The method according to claim 1, wherein the magnetoresistive film includes an intermediate layer, a free layer formed on one laminated layer surface side of the intermediate layer, and a pinned layer formed on the other laminated layer surface side of the intermediate layer; and wherein the intermediate layer is a current confined layer formed of a portion having relatively high resistance and another portion having relatively low resistance.

6. A method of fabricating a magnetic head slider, comprising the steps of:

forming a plurality of magnetic head elements each having a magnetoresistive film on a wafer;

cutting the wafer into row bars;

mechanically lapping an air-bearing surface of each of the row bars;

cleaning the mechanically lapped air-bearing surface by using an ion beam or gas plasma;

forming a first protection film on the cleaned air-bearing surface;

forming a rail on the air-bearing surface on which the first protection film is formed;

removing the first protection film;

cleaning, using an ion beam or gas plasma, the air-bearing surface from which the first protection film was removed;

exposing the second cleaned air-bearing surface to gas;

forming a second protection film on the air-bearing surface exposed to the gas; and cutting the row bar for every magnetic head element.

7. The method according to claim 6, wherein the gas is an oxygen-containing gas.

8. The method according to claim 7, wherein the product of time for introducing the oxygen-containing gas and oxygen partial pressure is not less than 0.005 Pa·sec and not greater than 3 pa·sec.

* * * * *